US010057015B1

(12) United States Patent
Naim et al.

(10) Patent No.: US 10,057,015 B1
(45) Date of Patent: Aug. 21, 2018

(54) HYBRID ARQ RE-TRANSMISSION OVER PEER-TO-PEER AIR INTERFACE UPON ERROR IN TRANSMISSION OVER CLIENT-SERVER AIR INTERFACE

(71) Applicant: Sprint Spectrum L.P., Overland Park, KS (US)

(72) Inventors: Muhammad A. Naim, Ashburn, VA (US); Yu Zhou, Herndon, VA (US); Luca Zappaterra, Arlington, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 237 days.

(21) Appl. No.: 14/873,934

(22) Filed: Oct. 2, 2015

(51) Int. Cl.
*H04W 72/04* (2009.01)
*H04W 24/00* (2009.01)
*H04L 1/08* (2006.01)
*H04L 27/26* (2006.01)
*H04L 1/18* (2006.01)
*H04W 84/12* (2009.01)

(52) U.S. Cl.
CPC ............. *H04L 1/08* (2013.01); *H04L 1/1812* (2013.01); *H04L 27/2601* (2013.01); *H04W 72/042* (2013.01); *H04W 72/0413* (2013.01); *H04W 84/12* (2013.01)

(58) Field of Classification Search
CPC ..... H04L 1/08; H04L 1/1812; H04L 27/2601; G04W 72/0413; G04W 72/042; H04W 84/12; H04W 92/10; H04W 24/10; H04W 72/042; H04W 72/08; H04W 92/12
See application file for complete search history.

(56) References Cited

U.S. PATENT DOCUMENTS

| 2013/0083722 A1* | 4/2013 | Bhargava | H04W 48/20 370/315 |
| 2013/0121296 A1* | 5/2013 | Jung | H04W 76/023 370/329 |
| 2014/0071873 A1* | 3/2014 | Wang | H04W 74/08 370/311 |

(Continued)

OTHER PUBLICATIONS

"The 3G4G Blog: LTE-Hetnet (LTE-H) a.k.a. LTE Wi-Fi Link Aggregation (LWA)," printed from the World Wide Web http://blog.3g4g.co.uk/2015/04/lte-htenet-lte-h-aka-let-si-fi-link.html, dated Apr. 12, 2015.

*Primary Examiner* — Phung M Chung (57) ABSTRACT

When a UE is being served by a base station over a first air interface in a client-server relationship and the UE receives from the base station a HARQ NACK for a transmission over the first air interface, the UE will responsively engage in the HARQ re-transmission to the base station over a second, different air interface, such as through a peer-to-peer communication to the base station. The first air interface may be an OFDMA air interface such as LTE, and the second air interface may be a WLAN air interface such as WiFi. Engaging in re-transmission via the second air interface may enable the base station to complete receipt of the data from the UE and thereby provide the UE, via the first air interface, with a HARQ ACK. This arrangement may help reduce delay in re-transmission, which may be particularly useful for delay-sensitive communications such as VoIP communications.

17 Claims, 5 Drawing Sheets

(56) References Cited

U.S. PATENT DOCUMENTS

| | | | |
|---|---|---|---|
| 2015/0103793 A1* | 4/2015 | Peng | H04W 76/025 370/329 |
| 2015/0215918 A1* | 7/2015 | Wu | H04W 72/0433 370/329 |
| 2015/0372788 A1* | 12/2015 | Xiao | H04L 1/08 714/748 |
| 2016/0338034 A1* | 11/2016 | Aiba | H04L 1/0026 |

* cited by examiner

HYBRID ARQ RE-TRANSMISSION OVER PEER-TO-PEER AIR INTERFACE UPON ERROR IN TRANSMISSION OVER CLIENT-SERVER AIR INTERFACE

BACKGROUND

In a wireless communication system, a base station may serve user equipment devices (UEs) such as cell phones, wirelessly-equipped computers, tracking devices, embedded wireless modules or the like (whether or not actually "user" operated) over an air interface. In practice, the air interface may define a continuum of transmission time intervals (TTIs) in which communications may pass on a downlink from the base station to the UEs and on an uplink from the UEs to the base station. In particular, in each TTI, the air interface may define a quantity of air interface resources, such as physical resource blocks (PRBs) or the like on which data may be modulated for transmission using an appropriate modulation and coding scheme.

When a UE is served by a base station in such an arrangement and the UE has data to communicate over the air to the base station, the UE may transmit to the base station a scheduling request asking the base station to assign air interface resources for uplink data transmission to the base station. Considering various factors, such as the extent of data that the UE has buffered for transmission, the UE's current air interface signal strength, the UE's available transmission power, and current load on the air interface, the base station may then allocate certain uplink air interface resources as a transport block for use by the UE to engage in uplink data transmission, providing a directive to the UE indicating the allocated resources. And the UE may then transmit data to base station on the allocated air interface resources.

In such a system, the base station and UE may also engage in a hybrid automatic repeat request (HARQ) process to manage re-transmission from the UE to the base station in the event of error. In a representative HARQ process, the UE may include with its transmission to the base station a cyclic redundancy check (CRC) that is computationally based on the transmitted data, and, upon receipt of the transmission, the base station may compute a CRC and determine whether it matches the CRC provided by the UE. If the CRC does not match (i.e., a CRC check fails) or if the base station otherwise determines that it has not completely received the data at issue (e.g., if the base station does not receive the scheduled transmission at all), the base station may then transmit to the UE on the air interface a HARQ negative acknowledgement (NACK), and the UE may then responsively re-transmit the data to the base station. In a representative system, the UE may engage in this re-transmission using the same air interfaces that the base station earlier allocated to the UE, but this time in a later TTI. On the other hand, if the CRC matches or the base station otherwise determines that it has completely received the data at issue, then the base station may transit to the UE a HARQ positive acknowledgement (ACK), which may let the UE know that the UE can proceed with a next data request/transmission rather than re-transmitting.

An example HARQ process may also involve the UE including with its transmission to the base station some forward error correction (FEC) bits that the base station can use as a basis to uncover the transmitted data in the event of an error. With such an arrangement, if the base station detects that the CRC does not match, the base station may try to apply the FEC bits to uncover the data (e.g., to get the CRC to match) and, absent success, may then send a HARQ NACK to the UE to trigger re-transmission. Further, the initial transmission and each re-transmission by the UE to the base station may include the same bits of data and perhaps different FEC bits if any, or may include different portions of the data bits and perhaps different FEC bits if any, but may still be considered re-transmission of the data. In practice, the base station may then work to complete its receipt of the UE's data transmission, perhaps by combining together the initial transmission with one or more re-transmissions (e.g., to piece together the intended data transmission and/or to apply various FEC bits to uncover the intended data transmission), or by ultimately receiving a successful transmission of the data and having it replace one or more previously received erroneous transmissions. Other arrangements are possible as well.

Through this process, once the base station completely receives the scheduled data transmission from the served UE, the base station may then forward the data via a backhaul link, such as a bearer tunnel established for the UE, to a switch or gateway, for transmission of the data turn onto a transport network such as the Internet.

OVERVIEW

One problem with a HARQ process such as that described above is that it adds delay into the UE's transmission to the base station. In some cases, this delay may not be especially problematic. However, certain types of data transmissions are delay sensitive, and the delay arising from the HARQ process may be problematic.

By way of example, voice over Internet Protocol (VoIP) communications and other packet-based real-time media communications (such as live video feeds and the like) are particularly delay sensitive, as they may require a relatively constant flow of data from end to end. For instance, in a representative VoIP call, a UE may apply a voice codec to encode a user's digitized voice at a particular rate, such as an Adaptive Multi-Rate (AMR) Wideband 12.65 codec that generates 253 bits of coded speech every 20 milliseconds (12.65 kilobits per second), and that encoded voice data should ideally pass from the UE to the base station an in turn ultimately to the other end of the VoIP call at the same rate, to be properly decoded and played out. If the UE's transmission of this encoded voice data to the base station fails for any reason, and the base station therefore requires re-transmission, the delay resulting from the re-transmission process may cause the voice data to arrive late at the other end of the VoIP call, which may undesirably result in distorted or broken voice communication.

Disclosed herein is a method and system to help address this issue. In accordance with the disclosure, when a UE is being served by a base station over a first air interface in a client-server relationship such as that described above and the UE receives from the base station a HARQ NACK for a transmission over the first air interface, the UE will responsively engage in the HARQ re-transmission to the base station over a second, different air interface, particularly a peer-to-peer air interface such as a WiFi air interface for instance. After sending to the UE a HARQ NACK for the transmission over the first air interface, the base station will thus receive the re-transmission from the UE over the second air interface and may use that received re-transmission as a basis to complete its receipt of the data from the UE—such as by combining the re-transmission with the initial transmission and/or with one or more intervening re-transmissions, or by using the re-transmission in place of the initial transmission or one or more intervening re-transmissions. Once the base station thus completely receives the data at issue, the base station may then transmit to the UE on the first air interface a HARQ ACK for the data transmission, and the base station may forward the received data via a backhaul connection as noted above.

Through this HARQ re-transmission via the second air interface, the UE's data may more readily arrive successfully at the base station, and thus possibly reduced end-to-end delay in the data transmission. This may be a result of less delay in transmitting via the second air interface (e.g., avoiding a need to wait a standard amount of time after receiving a HARQ NACK before engaging in the re-transmission). Further, this may be a result of possibly superior air interface conditions on the second air interface as compared with the first air interface. In practice, though, the base station may continue to serve the UE in the client-server relationship over the first air interface, as this process may simply provide a way to help deal with a particular HARQ re-transmission resulting from error in transmission on the first air interface, rather than having the base station and UE transition to communicate fully over the second air interface. Thus, the next transmission from the UE to the base station may again be scheduled by the base station and occur on the first air interface per the client-server relationship between the UE and the base station.

Accordingly, in one respect, disclosed herein is a method for communicating data from a UE to a base station, where the base station serves the UE in a client-server relationship over a first air interface. Per the method, the base station provides to the UE an allocation of air interface resources of the first air interface for use by the UE to transmit the data to the base station. In turn, the base station receives a transmission from the UE on the first air interface in accordance with the allocation, determines that the received transmission is in error, and responsive to the determining, sends to the UE on the first air interface a HARQ NACK of the transmission. And responsive to sending the HARQ NACK to the UE on the first air interface, the base station then receives a re-transmission of the data from the UE as a peer-to-peer wireless communication from the UE on a second air interface.

In addition, in another respect, disclosed is a similar method but from the perspective of the UE. Per the method, the UE receives from the base station an allocation of air interface resources of the first air interface for use by the UE to transmit the data to the base station. And responsive to receipt of the allocation, the UE provides a transmission to the base station on the first air interface in accordance with the allocation. In turn, the UE then receives from the base station, on the first air interface, a HARQ NACK of the transmission. And responsive to receipt of the HARQ NACK on the first air interface, the UE then provides a re-transmission of the data as a peer-to-peer wireless communication to the base station on a second air interface.

Further, disclosed is a UE operable to carry out such functions. As disclosed by way of example, the UE includes a user interface configured to receive user input and provide user output, and the UE includes a wireless communication interface configured to transmit and receive over both a first air interface and a second air interface. (For instance, the wireless communication interface may include two radios and associated logic, one for being served in a client-server relationship on the first air interface, and another for engaging in peer-to-peer communication on the second air interface.)

The disclosed UE is then configured to be served by the cellular base station in a client-server relationship over the first air interface and, when so served, to carry out operations comprising (i) receiving from the base station an allocation of air interface resources of the first air interface for use by the UE to transmit data to the base station and (ii) responsive to receipt of the allocation, providing a transmission to the base station on the first air interface in accordance with the allocation. Further, the UE is configured to receive from the base station on the first air interface a HARQ NACK of the transmission and, responsive to receipt of the HARQ NACK on the first air interface, to provide a re-transmission of the data as a peer-to-peer wireless communication to the base station on the second air interface.

These as well as other aspects, advantages, and alternatives will become apparent to those of ordinary skill in the art by reading the following detailed description, with reference where appropriate to the accompanying drawings. Further, it should be understood that the description provided in this overview section and elsewhere in this document is provided by way of example only.

DETAILED DESCRIPTION

The present disclosure will discuss the method and system by way of example in a scenario where a base station serves a UE in a client-server relationship with Long Term Evolution (LTE) cellular service, where the data communication at issue is a voice communication, and where the UE engages in HARQ re-transmission to the base station as a WiFi or other such wireless local area network (WLAN) peer-to-peer communication. Principles of the disclosure can apply in other contexts and arrangements as well, however, such as with respect to other air interface protocols and with respect to communications other than voice (whether or not delay sensitive). Further, numerous variations from the specifics described, even within the context of LTE, WiFi, and voice communication are possible as well. As such, the disclosure should be understood to be generally illustrative rather than limiting.

Referring to the drawings, as noted above, FIG. 1 depicts an example arrangement in which features of the disclosure can be implemented. As shown, the arrangement includes a representative LTE base station (evolved Node-B (eNodeB)) 12, which includes an LTE radio 14 and associated components for serving UEs over an LTE air interface 16, and a representative UE 18, which includes an LTE radio 20 for being served by base stations such as base station 12 over LTE air interface 16.

Figure 1:
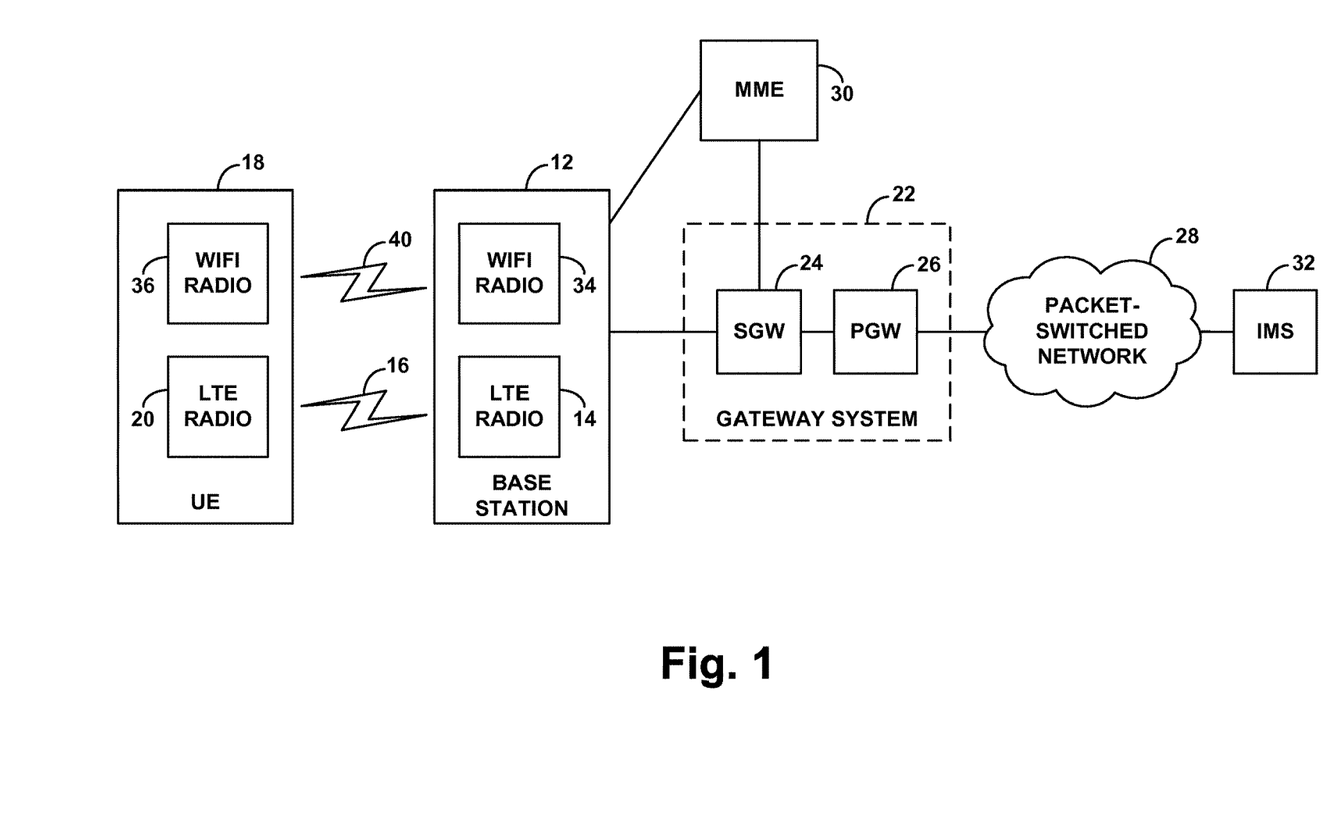
FIG. 1 is a simplified depiction of an arrangement in which features of the present disclosure can be implemented.

Base station 12 then has a communication interface with a gateway system 22, including a serving gateway (SGW) 24 and a packet data network gateway (PGW) 26, that provides connectivity in turn with a packet-switched network 28, and base station 12 further has a communication interface with a mobility management entity (MME) 30, which also has a communication interface with the serving gateway 24. Further, shown accessible via the packet-switched network 28 is then an Internet Multimedia Subsystem (IMS) platform 32, which functions to support VoIP and other packet-based real-time communication services for UEs such as UE 18.

With this LTE arrangement, when UE 18 enters into LTE coverage of base station 12, the UE may engage in a process of attaching with and/or handing over to the base station, so that the UE and can then be served by the base station in a client-server relationship. Through attachment or handover, one or more bearer tunnels may then be established for the UE, extending ultimately between the UE and the PGW, including a radio bearer between the UE and the base station, and corresponding tunnels between the base station and the SGW and between the SGW and the PGW. The base station may then provide the UE with LTE communication service, controlling uplink communication of data from the UE to the base station for transmission to the gateway system and onto the packet-switched network, and controlling downlink communication from base station to the UE of data that the gateway system receives from the packet-switched network and forwards to the base station for transmission to the UE.

As further shown in FIG. 1, the representative base station 12 also includes a WiFi radio 34 (possibly integrated on a chipset or otherwise with the base station's LTE radio 14) for engaging in WiFi communication, and the representative UE 18 also includes a WiFi radio 36 (possibly integrated on a chipset or otherwise with the UE's LTE radio 20) for engaging in WiFi communication. Through use of these WiFi radios, the UE and base station may engage in WiFi communication with each other over a WiFi air interface 40 in accordance with a standard WiFi protocol such as any of the IEEE 802.11 family of protocols.

With this arrangement, the base station may thus provide the UE with LTE service in a client-server relationship, and, upon receipt of a HARQ NACK for an uplink LTE transmission over air interface 16 to the base station, the UE may provide a re-transmission as a peer-to-peer WiFi communication over air interface 40 to the base station.

LTE is an example of an orthogonal frequency division multiple access (OFDMA) radio access technology in which the air interface between a base station and served UEs is structured as noted above. In particular, the air interface on both the downlink and the uplink may span a particular frequency bandwidth (such as 1.4 MHz, 3 MHz, 5 MHz, 10 MHz, or 20 MHz) that is divided primarily into subcarriers that are spaced apart from each other by 15 kHz. Further, the air interface may be divided over time into a continuum of 10-millisecond frames, with each frame being further divided into ten 1-millisecond subframes each defining a respective TTI. In each TTI, the air interface may then be considered to define a number of 12-subcarrier wide PRBs across the frequency bandwidth (i.e., as many PRBs as would fit in the frequency bandwidth).

In addition, each PRB may be divided over time into symbol segments of 67 μs each, with each symbol segment spanning the 12-subcarriers of the resource block and thus each supporting transmission of 12 orthogonal frequency division multiplex (OFDM) symbols in respective "resource elements." Thus, the base station and a served UE may transmit symbols to each other in these resource elements, particularly on subcarriers that are spaced apart from each other by 15 kHz and in time segments spanning 67 μs each.

The LTE air interface may then define various channels made up of certain ones of these resource blocks and resource elements. For instance, on the downlink, certain resource elements across the bandwidth may be reserved to define a physical downlink control channel (PDCCH), and other resource elements may be reserved to define a physical downlink shared channel (PDSCH) that the base station can allocate on an as-needed basis (by allocating the PRBs defining those PDSCH resource elements) to carry transmissions to particular UEs, with still other resource elements being reserved to define a downlink reference signal. Likewise, on the uplink, certain resource elements across the bandwidth may be reserved to define a physical uplink control channel (PUCCH), and other resource elements may be reserved to define a physical uplink shared channel (PUSCH) that the base station can allocate on an as-needed basis to carry transmissions from particular UEs (by allocating the PRBs defining those PUSCH resource elements).

Depending on the bandwidth of the coverage area, the air interface will thus have a particular limited extent of resources (resource units, such as PRBs and resource elements) that the eNodeB can allocate per unit time, such as per TTI. In practice, the base station may manage this allocation based on various factors such as the extent of data to be communicated, the UE's air interface channel quality, the load on the air interface, and so forth.

For instance, if the UE reports to the base station that the UE has a lot of data to transmit, the base station may seek to allocate a greater extent of resources. Further, if the base station is seeking to serve multiple UEs concurrently in a given TTI, the base station may limit the extent of resources per TTI that the base station allocates to any given UE.

Still further, the base station and a served UE may dynamically select a modulation and coding scheme (MCS) to use for modulating data on air interface resources based on the UE's channel quality and perhaps other factors, with each MCS supporting a corresponding bit rate. For instance, when the UE's channel quality is poor, the base station and UE may use a low-order MCS such as Quadrature Phase Shift Keying (QPSK), in which each symbol represents just 2 bits of data. Whereas, if the UE's channel quality is medium, the base station and UE may use a mid-order MCS such as 16 Quadrature Amplitude Modulation (16QAM), in which each symbol represents 4 bits of data. And if the UE's channel quality is high, the base station and UE may use a high-order MCS such as 64QAM, in which each symbol represents 6 bits of data. Further gradations of MCS and bit rate are possible as well.

In practice, a UE may from time to time determine its channel quality based on downlink air interface quality (e.g., downlink reference signal strength) and one or more other factors (e.g., UE's capabilities) and transmit to the base station a channel quality indicator (CQI) indicating the UE's determined channel quality. Using a standard CQI-MCS mapping table that maps CQI to MCS, the base station may then determine from the reported CQI what MCS to use for communication with the UE, and the base station may allocate air interface resources accordingly. Alternatively or additionally, the base station may from time to time evaluate uplink air interface quality (e.g., uplink reference signal strength) as a basis to determine the UE's channel quality, and the base station may similarly select an appropriate MCS for air interface communication with the UE.

When a UE is served by a base station in this arrangement and has data to transmit, the UE may transmit a scheduling request to the base station on the PUCCH, noting how much data the UE has buffered to transmit, and perhaps noting service level and/or other attributes of the planned communication. In response, the base station may then allocate one or more PRBs defining a transport block for the UE and may transmit to the UE on the PDCCH a Downlink Control Information (DCI) message that specifies the allocated PRBs and perhaps specifying an MCS for the UE to use for the transmission in view of the latest determined channel conditions. This DCI transmission on the PDCCH may be masked with an identifier associated with the UE, such as a cell radio network terminal identifier (C-RNTI) that the base station has assigned to the UE, so that the UE can detect and receive the DCI.

This allocated transport block may be in a single TTI, typically four milliseconds after the TTI in which the base station sends the DCI message to the UE. Further, as one way to help minimize HARQ re-transmission delay, the base station may employ a procedure known as "TTI bundling" by which the base station essentially directs the UE (e.g., through a directive in a DCI message) to engage in repeated transmission of the data in a series of TTIs, with each additional transmission being essentially like a HARQ re-transmission as discussed above but without waiting for a NACK from the base station to trigger the re-transmission and without the delay in waiting for the re-transmission to occur.

Further, if the UE will be engaging in periodic transmission, such as for VoIP communication for instance, the UE may include in its scheduling request to the base station an indication of the type and periodic nature of the communication. And the base station may then apply semi-persistent scheduling by allocating to the UE a periodically recurring transport block (perhaps also with TTI bundling) and may transmit to the UE a DCI message that specifies the periodically recurring transport block. For VoIP using the AMR Wideband 12.65 codec as described above, for instance, the base station may allocate a TTI transport block with a recurrence of 20 milliseconds, to carry a voice packet every 20 milliseconds.

Provided with the transport block allocation from the base station, the UE may then transmit accordingly. For instance, if the base station allocates a transport block consisting of particular PRBs in a specified TTI at a specified MCS, the UE may then transmit data in those particular PRBs in the specified TTI using the particular MCS. Further, if the base station schedules use of TTI bundling for such transmission, the UE may then transmit data in the allocated PRBs in a first TTI and autonomously engage in a re-transmission in the same PRBs each of one or more following TTIs. Likewise, if the base station applies semi-persistent scheduling and thus allocates a periodically recurring transport block (with or without TTI bundling), the UE may then accordingly transmit data in each periodic recurrence of the transport block.

To facilitate applying HARQ when a base station is serving a UE in this type of client-server arrangement, LTE further reserves certain downlink resource elements in each TTI to define a physical HARQ indicator channel (PHICH). When the base station receives a scheduled LTE transmission from a UE and determines that the transmission is in error (e.g., that a CRC does not match), the base station may then transmit a HARQ NACK to the UE on the PHICIH. According to a current version of LTE, the UE would receive this NACK four TTIs (four milliseconds) after the uplink transmission occurred, and the UE would then responsively provide a re-transmission using the same allocated PRBs, a defined number of TTIs later. For a single-TTI allocation, for instance, the UE would automatically re-transmit four TTIs (four milliseconds) after receiving the NACK. With TTI bundling, on the other hand, the UE would automatically re-transmit with even more delay, such as eight or nine TTIs (eight or nine milliseconds) after receiving the NACK. Further, in a time division duplex (TDD) arrangement where only select TTIs are used for uplink communication, this delay may be even longer.

Especially for VoIP or other such real-time packet-based communications, as noted above, this added delay may be problematic.

Per the present disclosure, when a UE receives a HARQ ACK from its serving base station, the UE may opportunistically engage in HARQ re-transmission to the base station as a peer-to-peer WiFi communication to the base station. (In practice, the UE may do this instead of engaging in the standard LTE re-transmission to the base station via the LTE air interface, or the UE may do this in addition to engaging in the standard LTE re-transmission to the base station via the LTE air interface. As one example, if the re-transmission via WiFi arrives at the base station and the UE then receives on the LTE PHICH from the base station a HARQ ACK before the UE has engaged in the re-transmission via LTE, the UE may responsively forgo engaging in the re-transmission via LTE.)

To facilitate this, the UE and base station may each include a WiFi radio and standard WiFi communication logic (in addition to, but possibly integrated with, their respective LTE radios and LTE communication logic) so as to engage in peer-to-peer WiFi communication with each other, in much the same way that a UE may engage in WiFi communication with a WiFi access point or other WiFi equipped device. As such, the UE and base station may each have two separate hardware addresses such as Media Access Control (MAC) addresses, one for their LTE radio and another for their WiFi radio. The UE may be associated with the base station through a standard WiFi association process (e.g., with the base station broadcasting a WiFi SSID, the UE sending a WiFi association request, and so forth), and the UE and base station may thus be set to engage in WiFi peer-to-peer communication with each other. Alternatively, the UE and base station may not engage in WiFi association but may still engage in WiFi peer-to-peer communication with each other, directed to their respective hardware addresses. In peer-to-peer communication like this, as compared with the client-server model, the base station does not allocate air interface resources for uplink transmission by the UE.

Using WiFi as the example peer-to-peer communication protocol, this also assumes that the UE and base station are within WiFi communication range of each other. This may be the case especially where the base station is a small cell base station or relay base station that provides LTE coverage over a relatively small area, where the base station is a macro base station or the like and the UE is relatively close to the base station, or where a repeater or range extender is in use. Alternatively, this may be the case if the WiFi protocol allows longer distance WiFi communication (e.g., at relatively high transmission power level and/or at lower frequencies that have less path loss). If not, then the process may work better with another peer-to-peer wireless communication protocol now known or later developed.

In a representative implementation, for instance, the base station may broadcast in an overhead LTE system message, or may unicast to the UE, an indication of the base station's WiFi MAC address, so that the UE will have a record of that address and be able to engage in WiFi communication to the base station at that address. Further, the UE may report its WiFi MAC address to the base station during attachment with the base station, or the base station may determine the UE's WiFi MAC address if the address is specified in an LTE profile record for the UE that the base station receives during attachment, so that the base station may recognize communication from that WiFi MAC address as coming from the UE that the base station is currently serving in an LTE client-server relationship. Alternatively, other mechanisms could be provided for sharing this information between the UE and the base station.

WiFi communication may occur on one or more 20 MHz channels at defined locations in the frequency spectrum, and the devices engaging in WiFi communication may be set to do so in a standard manner on such channel(s). In practice, a device seeking to engage in WiFi transmission to another device may apply carrier sense multiple access (CSMA) on each such channel to ensure that there is no other communication currently occurring on the channel. For instance, the transmitting device may monitor the channel for a predefined short time interval to verify that the channel is available. And if the transmitting device determines that the channel is available, the device may then engage in data transmission on the channel to the other device, including a header designating source and destination WiFi MAC addresses.

Further, devices engaging in WiFi communication may also be set to use a handshake process to prepare for such transmission on a per WiFi channel basis, which may also help neighboring devices avoid interfering with use of the WiFi channel. In practice, for instance, once the transmitting device determines that the WiFi channel is available, the transmitting device may send on the WiFi channel to the receiving device a ready-to-send (RTS) message; once the receiving device receives the RTS message from the transmitting device, the receiving device may then send on the WiFi channel to the transmitting device a clear-to-send (CTS) message; once the transmitting device receives the CTS message, the transmitting device then sends the data on the WiFi channel to the receiving device; and once the receiving device receives the data, the receiving device sends on the WiFi channel an ACK to the transmitting device. In the present process, this RTS/CTS may undesirably delay the HARQ re-transmission via WiFi, so it may not be especially desirable. But it could be used if desired.

For most forms of communication between two devices, such as in LTE and in WiFi, each device may implement a protocol stack that defines a sequence of logical processing layers, ranging from an application layer down to a physical layer (such as an LTE or WiFi air interface). In practice, a transmitting device may generate data at the application layer, process the data through the protocol stack down to a physical layer, and transmit the data at the physical layer to a receiving device. And the receiving device may receive the transmission at the physical layer, and process the received transmission through the protocol stack up to the application layer. When a UE is engaged in communication with a remote party via a base station that serves the UE, the application and one or more other higher layers of the protocol stack may manage communication between the UE and the remote party, whereas one or more lower layers including the physical layer may manage communication between the UE and the base station.

In a specific arrangement when a UE is engaged in a VoIP call with a remote party, the UE may apply a voice codec (e.g., an AMR Wideband codec) at its application layer to encode digitized voice and may encapsulate each successive segment of the encoded digitized voice in a Real-time Transport Protocol (RTP) header. Each RTP packet may then pass to a Transport layer, where the UE may add a UDP header, and to an Internet layer, where the UE may add may add an IP header, thus producing an IP packet. To facilitate efficient air interface transmission of such a packet, the packet may then pass to a Packet Data Convergence Protocol (PDCP) layer, where the UE may apply robust header compression (RoHC) that may replace the RTP, UDP, and IP headers with a much smaller RoHC header. In turn, each packet with compressed header may then pass through one or more link layers such as a Radio Link Protocol (RLP) layer, where the UE may add an RLP header, and a Media Access Control (MAC) layer, where the UE may add a MAC layer, and the UE may then modulate the end result on the physical layer for transmission over the air to the base station.

Upon receipt of such a transmission from the UE, the base station may then reverse the processing of the MAC, RLP, and PDCP layers, to uncover the IP packets, and may forward the IP packets to a gateway system or the like (e.g., via a bearer tunnel established for the UE between the base station and the gateway system) for transmission via a packet-switched network to the remote party.

To facilitate implementation of the presently disclosed process, the UE and base station may both be configured with enhanced logic (e.g., executable program instructions) at their MAC layers and at their PDCP layers to carry out operations described herein Under LTE, the UE and base station may engage in the HARQ process at their MAC layers, with the base station sending to the UE a HARQ NACK for an erred LTE uplink transmission. When the UE receives that HARQ NACK, a UE operating without the present advance may responsively operate at its MAC layer to trigger re-transmission over the LTE air interface as discussed above. With the present advance, however, when the UE receives the HARQ NACK, the UE's MAC layer may signal accordingly to the UE's PDCP layer, and the UE may responsively operate at its PDCP layer to trigger transmission of the data at issue (e.g., the PDCP-layer data, with RoHC) via WiFi. Thus, the data may then pass from the UE's PDCP layer to the UE's MAC layer, where the UE would add a WiFi MAC header, and in turn to the WiFi physical layer, where the UE would transmit the data to the base station's WiFi receiver.

Upon receipt of this WiFi transmission, the base station may then process the WiFi-received transmission up through the base station's WiFi MAC layer and to the base station's PDCP layer. And from there, the base station may pass the received WiFi-transmission back down to the base station's LTE MAC layer, where the base station may then use the WiFi-received transmission in the LTE HARQ process. In particular, the base station may then treat the transmission that it received via WiFi in the same manner as the base station would have treated a transmission that the base station received via LTE. Thus, the base station may determine whether that received transmission, either alone or in combination with the UE's initial transmission via LTE (and perhaps with one or more intervening re-transmissions) results in completion of the base station's receipt of the intended data from the UE. If so, then the base station may transmit to the UE on the LTE PHICH a HARQ ACK. And if not, then the base station may transmit to the UE on the LTE PHICH a HARQ NACK, in which case the UE may then again more engage in HARQ re-transmission via WiFi.

Figure 2:
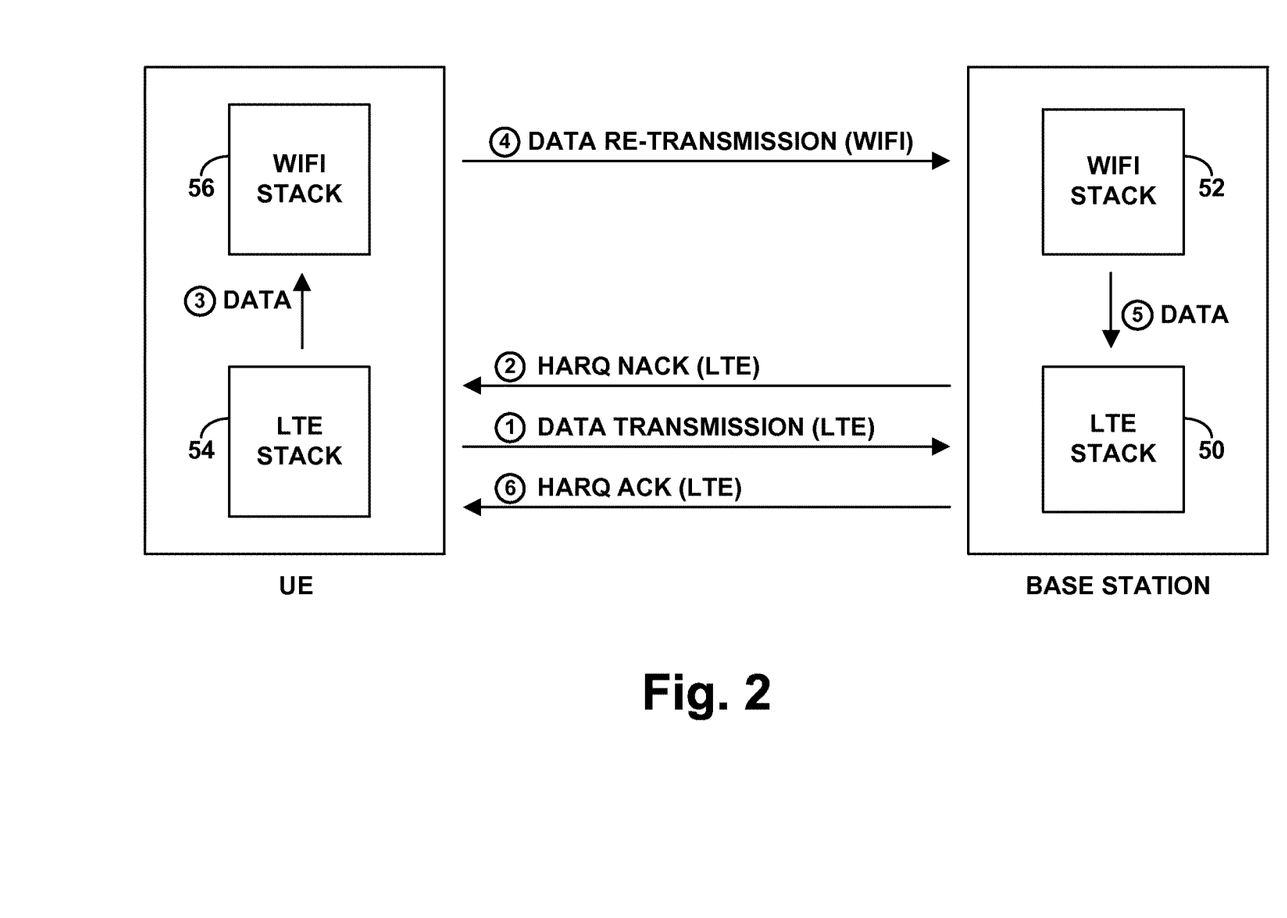
FIG. 2 is a depiction of an example process flow in accordance with the disclosure.

FIG. 2 is next a diagram depicting this process flow by way of example. FIG. 2 shows the base station 12 containing an LTE protocol stack 50 and a WiFi protocol stack 52, and the UE 18 containing an LTE protocol stack 54 and a WiFi protocol stack 56. In practice, the base station and UE may each have a full protocol stack that branches into these LTE and WiFi protocol stacks. In particular, the full protocol stack may include upper layers such an application layer, a transport layer, a network layer, and a PDCP layer, and the protocol stack may then branch into (i) LTE layers including an LTE RLP layer, an LTE MAC layer, and an LTE physical layer and (ii) WiFi layers including a WiFi MAC layer and a WiFi physical layer. As such, the full protocol stack including the LTE layers may be considered an LTE protocol stack as shown, and the full protocol stack including the WiFi layers may be considered a WiFi protocol stack as shown.

The flow of FIG. 2 may begin with data passing from the PDCP layer down to the LTE layers for transmission to the base station. At step 1, the UE thus transmits the data via LTE to the base station. At step 2, the base station then transmits a HARQ NACK via LTE to the UE. At step 3, the UE then passes the data from its LTE stack to its WiFi stack, such as by processing from the LTE MAC layer up to the PDCP layer and then down to the WiFi MAC layer. And at step 4, the UE then provides a re-transmission of the data via WiFi to the base station. At step 5, the base station then passes the WiFi-received re-transmission from its WiFi stack to its LTE stack, such as by processing from the WiFi MAC layer up to the PDCP layer and then down to the LTE MAC layer. The base station then uses that received re-transmission at its LTE MAC layer as a basis (alone or in combination with one previously or later received other transmission via WiFi or LTE) to determine that the base station has now completely received the data at issue. And at step 6, the base station then transmits a HARQ ACK via LTE to the UE.

Figure 3:
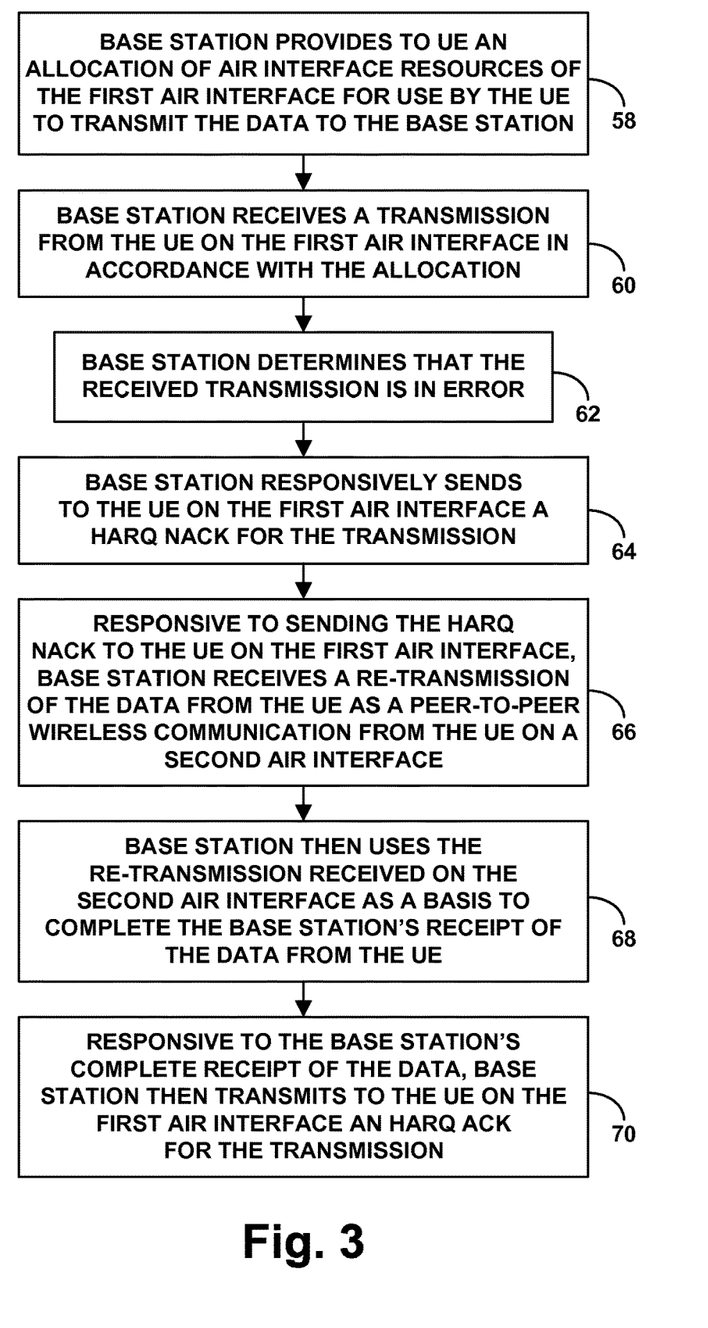
FIG. 3 is a flow chart depicting operations of an example method.

FIG. 3 is next a flow chart depicting operations that can be carried out by a base station (e.g., base station 12) in accordance with the present disclosure, to facilitate communicating data from a UE (e.g., UE 18) to the base station in a situation where the base station serves the UE in a client-server relationship over a first air interface (e.g., an OFDMA air interface such as LTE air interface 16). As shown in FIG. 3, at block 58, the base station provides to the UE an allocation of air interface resources of the first air interface for use by the UE to transmit the data to the base station. For instance, the base station may transmit on an LTE PDCCH to the UE a DCI message or other such directive specifying the allocation, such as particular PRBs.

At block 60, the base station then receives a transmission from the UE on the first air interface in accordance with the allocation, such as by receiving from the UE a transmission of data in the specified PRBs. And at block 62, the base station determines that the received transmission is in error, such as by detecting a CRC mismatch. In turn, at block 64, the base station responsively sends to the UE on the first air interface a HARQ NACK for the transmission, such as by transmitting the HARQ NACK to the UE on an LTE PHICH.

At block 66, responsive to sending the HARQ NACK to the UE on the first air interface (i.e., because of that), the base station receives a re-transmission of the data from the UE as a peer-to-peer wireless communication from the UE on a second air interface (e.g., a WLAN air interface such as WiFi air interface 40). At block 68, the base station then uses the re-transmission received on the second air interface as a basis to complete the base station's receipt of the data from the UE, such as by using it as a replacement for an earlier erred transmission or in combination with one or more earlier transmissions. And at block 70, responsive to the base station's complete receipt of the data, the base station then transmits to the UE on the first air interface an HARQ ACK for the transmission, such as by transmitting the HARQ ACK to the UE on an LTE PHICH.

In this process, the HARQ signaling between the base station and the UE may be managed at the LTE MAC layer (via the physical layer). Thus, transmitting of the HARQ NACK may be from a MAC layer of the base station to a corresponding MAC layer of the UE. Whereas, the peer-to-peer communication may occur at the PDCP layer (via the lower layers including the WiFi physical layer for instance. Thus, the peer-to-peer communication may be from a PDCP layer of the UE to a corresponding PDCP layer of the base station, with the base station then passing the received transmission down to the LTE MAC layer for HARQ processing.

Figure 4:
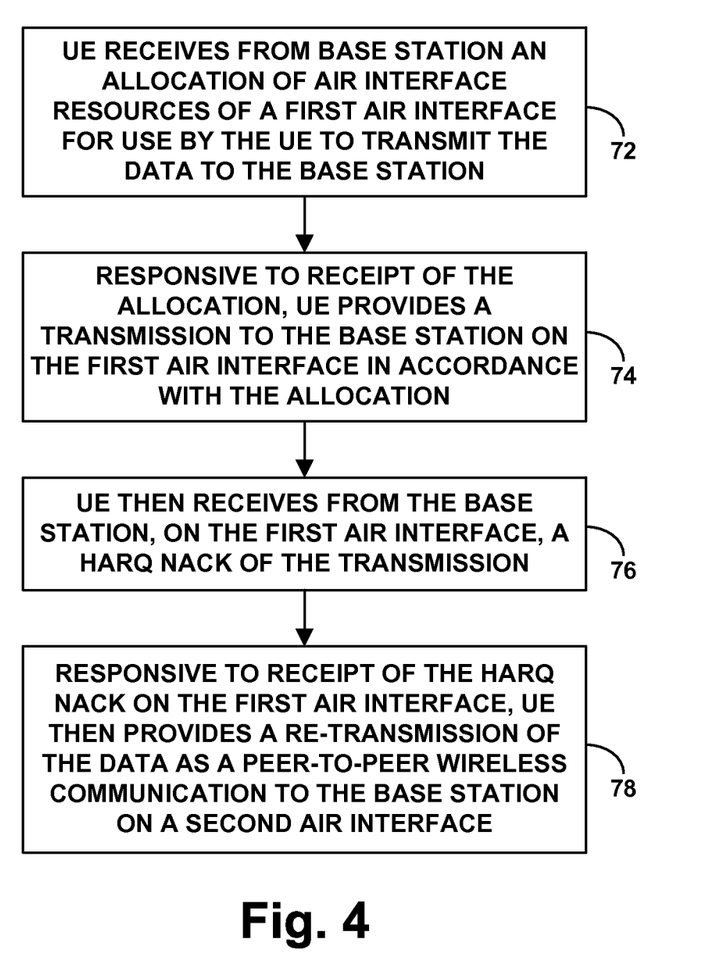
FIG. 4 is another flow chart depicting operations of an example method.

FIG. 4 is next a flow chart depicting operations that can be carried out by a UE (e.g., UE 18) in accordance with the present disclosure, to facilitate communicating data from the UE to a base station (e.g., base station 12) in a situation where the base station serves the UE in a client-server relationship over a first air interface (e.g., an OFDMA air interface such as LTE air interface 16). As shown in FIG. 4, at block 72, the UE receives from the base station an allocation of air interface resources of the first air interface for use by the UE to transmit the data to the base station. At block 74, responsive to receipt of the allocation, the UE provides a transmission to the base station on the first air interface in accordance with the allocation. At block 76, the UE then receives from the base station, on the first air interface, a HARQ NACK of the transmission. And at block 78, responsive to receipt of the HARQ NACK on the first air interface, the UE then provides a re-transmission of the data as a peer-to-peer wireless communication to the base station on a second air interface (e.g., a WLAN air interface such as WiFi air interface 40).

Features described above may apply in the process of FIG. 4 as well. For instance, receipt of the allocation could involve receiving a DCI message on an LTE PDCCH from the base station. And the allocation could involve TTI bundling. Further, the method may then further involve, after the UE provides the re-transmission via the second air interface to the base station, the UE receiving from the base station via the first air interface a HARQ ACK indicating that the base station has completed receipt of the data from the UE.

Figure 5:
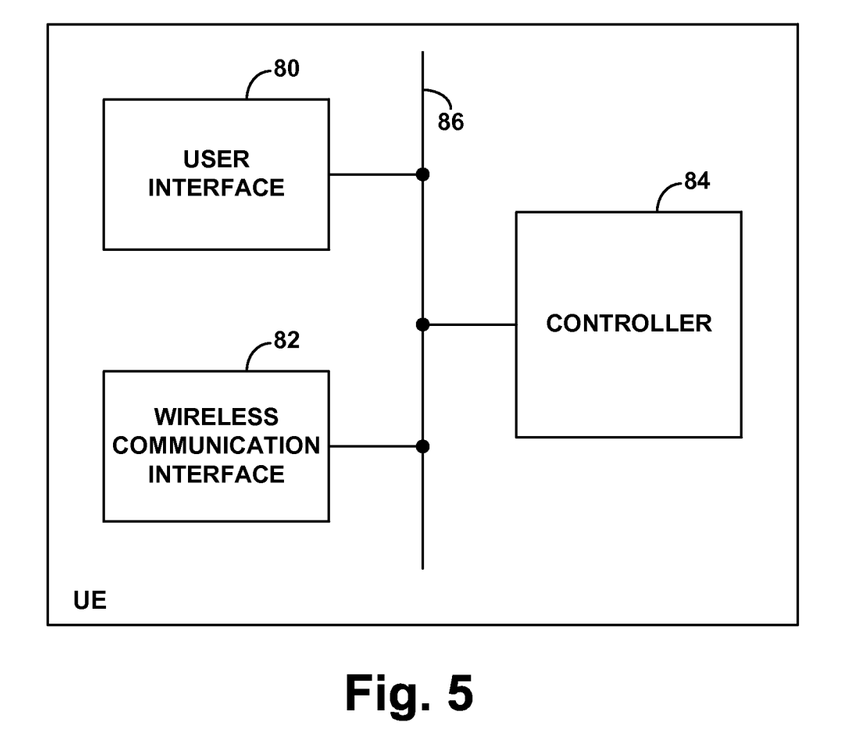
FIG. 5 is a block diagram depicting components of an example UE.

Finally, FIG. 5 is a simplified block diagram of an example UE, showing some of the components that can be included in such a UE to facilitate carrying out features of the present disclosure, such as with respect to a VoIP call for instance, to help avoid or minimize undesired delay in transmission of voice data or other data.

As shown in FIG. 4, the example UE includes a user interface 80, a wireless communication interface 82, and a controller 84, all of which may reside within or on a housing and be integrated or communicatively linked together by a system bus, network, or other connection mechanism 86.

User interface 80 is configured to allow the UE to receive user input and provide user output. Thus, the user interface may include one or more input components such as a microphone, a camera, a keypad, and a touch-sensitive display. And the user interface may include one or more output components such as a sound speaker and a display screen. Further, the user interface may include analog-digital conversion circuitry, such for converting voice input to a digital representation of the voice and for converting a digital representation of voice into speech output.

Wireless communication interface 82 is configured to allow the UE to transmit and receive over both a first air interface (e.g., LTE air interface 16) and a second air interface (e.g., WiFi air interface 40). In line with the discussion above, the wireless communication interface may include separate or integrated radios specifically for engaging in LTE and WiFi communication for instance, along with a processing unit programmed with program instructions defining protocol stacks operable as described above. Further, the wireless communication interface may include or be interconnected with one or more antenna structures to facilitate the air interface communication.

Controller 84, which may effectively be part of the wireless communication interface or may be provided separately, may then or therefore be configured to cause the UE to carry out various UE operations described herein. As such, the controller may take various forms. For instance the controller may be hard coded or provided as hardware such as an application specific integrated circuit or other structure. Alternatively or additionally, the controller could be provided as one or more processors (e.g. one or more microprocessors), non-transitory data storage, and program instructions stored in the data storage and executable by the processor(s) to carry out the various described operations.

For instance, the controller (and thus the UE) may be configured to be served by a cellular base station in a client-server relationship over the first air interface and, when so served, to carry out operations comprising (i) receiving from the base station an allocation of air interface resources of the first air interface for use by the UE to transmit data to the base station and (ii) responsive to receipt of the allocation, providing a transmission to the base station on the first air interface in accordance with the allocation. Further, the controller (and thus the UE) may be configured to receive from the base station on the first air interface a HARQ NACK of the transmission and, responsive to receipt of the HARQ NACK on the first air interface, to provide a re-transmission of the data as a peer-to-peer wireless communication to the base station on the second air interface. Various features described above could be applied in this context as well.

Exemplary embodiments have been described above. Those skilled in the art will understand, however, that changes and modifications may be made to these embodiments without departing from the true scope and spirit of the invention.

We claim:

1. A method for communicating data from a user equipment device (UE) to a base station, wherein the base station serves the UE in a client-server relationship over a first air interface, the method comprising:
    providing, by the base station to the UE, an allocation of air interface resources of the first air interface for use by the UE to transmit the data to the base station;
    receiving by the base station a transmission from the UE on the first air interface in accordance with the allocation, determining by the base station that the received transmission is in error, and responsive to the determining, sending by the base station to the UE on the first air interface a hybrid automatic repeat request (HARQ) negative acknowledgement (NACK) of the transmission;
    responsive to sending the HARQ NACK to the UE on the first air interface, then receiving by the base station a re-transmission of the data from the UE to the base station as a peer-to-peer wireless communication from the UE on a second air interface;
    using by the base station the received re-transmission of the data as a basis to complete receipt by the base station of the data from the UE; and
    responsive to completion of receipt of the data by the base station based on the re-transmission received on the second air interface, transmitting to the UE on the first air interface a HARQ positive acknowledgement (ACK) confirming completion of receipt of the data by the base station.

2. The method of claim 1, wherein the first air interface is an orthogonal frequency division multiple access (OFDMA) cellular air interface, and wherein the second air interface is a wireless local area network (WLAN) air interface.

3. The method of claim 1, wherein providing by the base station to the UE the allocation of air interface resources of the first air interface for use by the UE to transmit the data to the base station comprises sending on the first air interface from the base station to the UE a directive that specifies the uplink resources of the first air interface on which the UE should engage in the transmission.

4. The method of claim 3, wherein the first air interface defines a physical downlink control channel (PDCCH), and wherein sending the directive comprises sending on the PDCCH a downlink control information (DCI) message masked with an identifier associated with the UE, the DCI message specifying the allocation.

5. The method of claim 1, wherein the transmitting of the HARQ NACK is from a media access control (MAC) layer of the base station to a corresponding MAC layer of the UE, and wherein the peer-to-peer communication is from a packet-data control protocol (PDCP) layer of the UE to a corresponding PDCP layer of the base station.

6. The method of claim 1, wherein the allocation of air interface resources of the first air interface for use by the UE to transmit the data to the base station includes transmission time interval (TTI) bundling.

7. The method of claim 1, wherein the data comprises voice data.

8. The method of claim 1, wherein determining by the base station that the received transmission is in error comprises determining by the base station that a cyclic redundancy check of the received uplink transmission fails.

9. The method of claim 1, wherein using the received re-transmission of the data as a basis to complete receipt by the base station of the data from the UE comprises an operation selected from the group consisting of (i) using the re-transmission received on the second air interface in place of the transmission received on the first air interface and (ii) combining the re-transmission received on the second air interface with the transmission received on the first air interface.

10. The method of claim 1, wherein a bearer tunnel for the UE extends between the base station and a gateway system, the method further comprising forwarding by the base station the completely received data via the bearer tunnel to the gateway system.

11. A method for communicating data from a user equipment device (UE) to a base station, wherein the UE is served by the base station in a client-server relationship over a first air interface, the method comprising:
    receiving, by the UE from the base station, an allocation of air interface resources of the first air interface for use by the UE to transmit the data to the base station;
    responsive to receipt of the allocation, providing by the UE a transmission to the base station on the first air interface in accordance with the allocation;
    receiving, by the UE from the base station, on the first air interface, a hybrid automatic repeat request (HARQ) negative acknowledgement (NACK) of the transmission;

responsive to receipt of the HARQ NACK on the first air interface, then providing by the UE a re-transmission of the data as a peer-to-peer wireless communication to the base station on a second air interface;

after providing the re-transmission of the data as the peer-to-peer wireless communication to the base station on the second air interface, receiving by the UE from the base station on the first air interface a HARQ positive acknowledgement (ACK) confirming completion of receipt of the data by the base station.

12. The method of claim 11, wherein the first air interface is an orthogonal frequency division multiple access (OFDMA) cellular air interface, and wherein the second air interface is a wireless local area network (WLAN) air interface.

13. The method of claim 11, wherein receiving by the UE from the base station the allocation of air interface resources of the first air interface for use by the UE to transmit the data to the base station comprises receiving by the UE on the first air interface from the base station a directive that specifies uplink resources of the first air interface on which the UE should provide the transmission.

14. The method of claim 13, wherein the first air interface defines a physical downlink control channel (PDCCH), and wherein receiving the directive comprises receiving on the PDCCH a downlink control information (DCI) message masked with an identifier associated with the UE, the DCI message specifying the allocation.

15. The method of claim 11, wherein the allocation of air interface resources of the first air interface for use by the UE to transmit the data to the base station includes transmission time interval (TTI) bundling.

16. A user-equipment device (UE) comprising:
a user interface configured to receive user input and provide user output; and
a wireless communication interface configured to transmit and receive over both a first air interface and a second air interface, the UE being configured to be served by a cellular base station in a client-server relationship over the first air interface and, when so served, to carry out operations comprising (i) receiving from the base station an allocation of air interface resources of the first air interface for use by the UE to transmit data to the base station and (ii) responsive to receipt of the allocation, providing a transmission to the base station on the first air interface in accordance with the allocation, the UE being further configured to receive from the base station on the first air interface a hybrid automatic repeat request (HARQ) negative acknowledgement (NACK) of the transmission and, responsive to receipt of the HARQ NACK on the first air interface, to provide a re-transmission of the data as a peer-to-peer wireless communication to the base station on the second air interface, and the UE being further configured to receive from the base station on the first air interface a HARQ positive acknowledgement (ACK) after the UE provides the re-transmission to the base station on the second air interface, wherein the HARQ ACK confirms completion of receipt of the data by the base station.

17. The UE of claim 16,
wherein the first air interface defines a physical downlink control channel (PDCCH), and wherein receiving from the base station the allocation of air interface resources of the first air interface for use by the UE to transmit the data to the base station comprises receiving on the PDCCH a downlink control information (DCI) message masked with an identifier associated with the UE, the DCI message specifying the allocation.

* * * * *